United States Patent
Nagda et al.

(10) Patent No.: US 6,862,524 B1
(45) Date of Patent: Mar. 1, 2005

(54) USING LOCATION DATA TO DETERMINE TRAFFIC AND ROUTE INFORMATION

(75) Inventors: Paresh Nagda, Fremont, CA (US); Wenbin Li, Newark, CA (US); Julia Howlett, San Jose, CA (US); Rodric C. Fan, Fremont, CA (US); Xinnong Yang, Shanghai (CN); James D. Fay, Palo Alto, CA (US)

(73) Assignee: At Road, Inc., Fremont, CA (US)

( * ) Notice: Subject to any disclaimer, the term of this patent is extended or adjusted under 35 U.S.C. 154(b) by 49 days.

(21) Appl. No.: 10/436,114

(22) Filed: May 9, 2003

Related U.S. Application Data

(63) Continuation-in-part of application No. 09/898,682, filed on Jul. 3, 2001, now Pat. No. 6,594,576.

(51) Int. Cl.[7] ............................................. G06F 15/50
(52) U.S. Cl. ..................... 701/209; 701/117; 701/207; 701/211; 340/988; 340/990; 340/995.13; 340/995.18
(58) Field of Search ................................. 701/117, 118, 701/119, 201, 202, 207, 208, 209, 211; 342/357.13, 357.07; 340/988, 989, 990, 995.1, 995.13, 995.18, 539.13

(56) References Cited

U.S. PATENT DOCUMENTS

| | | | |
|---|---|---|---|
| 5,008,661 A | * 4/1991 | Raj | 340/10.51 |
| 5,014,206 A | * 5/1991 | Scribner et al. | 701/207 |
| 5,146,219 A | * 9/1992 | Zechnall | 340/995.24 |
| 5,243,528 A | * 9/1993 | Lefebvre | 701/211 |
| 5,347,274 A | * 9/1994 | Hassett | 340/988 |
| 5,428,545 A | 6/1995 | Maegawa et al. | |
| 5,539,645 A | 7/1996 | Mandhyan et al. | |
| 5,664,112 A | * 9/1997 | Sturgeon et al. | 705/28 |
| 5,726,884 A | * 3/1998 | Sturgeon et al. | 705/9 |
| 5,831,552 A | * 11/1998 | Sogawa et al. | 340/995.27 |
| 5,908,464 A | 6/1999 | Kishigami et al. | |
| 5,911,773 A | 6/1999 | Mutsuga et al. | |
| 5,931,888 A | 8/1999 | Hiyokawa | |
| 5,959,577 A | 9/1999 | Fan et al. | |
| 5,990,827 A | 11/1999 | Fan et al. | |
| 6,026,346 A | 2/2000 | Ohashi et al. | |
| 6,141,609 A | * 10/2000 | Herdeg et al. | 701/35 |
| 6,150,961 A | 11/2000 | Alewine et al. | |
| 6,236,933 B1 | 5/2001 | Lang | |
| 6,256,577 B1 | 7/2001 | Graunke | |
| 6,282,486 B1 | 8/2001 | Bates et al. | |
| 6,353,795 B1 | 3/2002 | Ranjan | |
| 6,459,988 B1 | 10/2002 | Fan et al. | |
| 6,529,159 B1 | 3/2003 | Fan et al. | |

FOREIGN PATENT DOCUMENTS

WO    WO 9407225 A1 * 3/1994    ........ G08G/1/123

* cited by examiner

Primary Examiner—Thomas G. Black
Assistant Examiner—Eric M. Gibson
(74) Attorney, Agent, or Firm—MacPherson Kwok Chen & Heid LLP; Greg J. Michelson

(57) ABSTRACT

System and methods for determining and disseminating current traffic information and/or route information are presented. For example, in accordance with one embodiment of the present invention, traffic condition information is collected from mobile units that provide their location or position information. The traffic condition may be determined, for example, based on the difference between the velocity of each mobile unit and the speed limit corresponding to their location. Furthermore, the fastest routes between two locations may be determined and provided based on historical and/or current conditions and provided to a mobile unit. In accordance with another embodiment of the present invention, route information may be utilized to determine whether a mobile unit (e.g., associated with a vehicle) is allowed or prohibited from traveling along a certain route.

38 Claims, 14 Drawing Sheets

| vehicle * | location | actual velocity | speed limit | difference | traffic level indicator | mileage |
|---|---|---|---|---|---|---|
|  |  |  |  |  |  |  |
|  |  |  |  |  |  |  |
|  |  |  |  |  |  |  |
| ⋮ | ⋮ | ⋮ | ⋮ | ⋮ | ⋮ | ⋮ |
|  |  |  |  |  |  |  |
|  |  |  |  |  |  |  |
|  |  |  |  |  |  |  |

| road segment 0 | # of mobile units | average speed | time elapsed since last update | length of segment | est. travel time |
|---|---|---|---|---|---|
| ... | ... | ... | ... | ... | ... |

FIG. 5

USING LOCATION DATA TO DETERMINE TRAFFIC AND ROUTE INFORMATION

CROSS-REFERENCE TO RELATED APPLICATIONS

This is a continuation-in-part of U.S. patent application Ser. No. 09/898,682 filed Jul. 3, 2001, now U.S. Pat. No. 6,594,576, which is incorporated herein by reference in its entirety.

BACKGROUND

1. Field of the Invention

The invention relates to a system and a method for using location information to determine traffic conditions and/or route conditions or limitations such as, for example, limitations or rules pertaining to a location or a route.

2. Discussion of the Related Art

Methods for determining the position of vehicles, airplanes, and ships include, for example, time difference of arrival (TDOA), angle of arrival (AOA), ray tracing/pattern recognition, global positioning system (GPS), and hybrid methods using network connections. Among the available methods, GPS includes a plurality of satellites orbiting the earth and sending out, at precisely synchronized times, a code sequence that identifies the satellite. Specifically, the code sequence transmitted by each satellite is a precisely timed binary pulse train. In addition to the code sequence, these satellites send out positioning information that can be used to calculate vehicle positions. A GPS receiver retrieves the positioning information from the GPS satellites and triangulates the information to obtain the position of the receiver. A more detailed discussion of a GPS receiver is found in U.S. Pat. No. 5,990,827 to Rodric C. Fan, et al. entitled "Structure of a Position Processing Apparatus," which is herein incorporated in its entirety.

In using GPS to locate vehicles, each vehicle is equipped with a GPS receiver and a wireless transmitter. Using the GPS receiver and the transmitter, the vehicle determines its position and transmits the position to a ground station. The ground station of a conventional vehicle locating system normally includes a map database search system and some type of storage medium that stores digital maps and travel-related information. Thus, upon receiving the vehicle positions from the mobile units, the ground station combines the stored data with the received information and displays the present vehicle positions on a digital map.

In some cases, a data network, such as the Internet, is involved in locating vehicles. When a data network is involved, the vehicle determines its position and transmits the position information to a network server. This data transmission from a vehicle to the network server is accomplished wirelessly by, for example, cellular digital packet data network (CDPD) that connects to a data network (e.g., the Internet), which in turn provides access to the network server. In some cases, the mobile units may transmit raw data to the network server so that the network server can make the position determination. In a system that involves a network server, the data storage medium may be accessed by the network server instead of the ground station. The data storage medium contains travel-related information such as maps, traffic conditions, positions of service stations, and destinations of interest. Thus, the data processing unit organizes the measured position and generates an area map. The area map indicates by a position marker the position of each mobile unit.

As mentioned above, vehicles can connect to data networks (e.g., the Internet) wirelessly through communication networks, for example a CDPD network. CDPD networks consist of Mobile Data Intermediate Systems (MDISs), Mobile Data Base Stations (MDBSs), and Mobile End Stations (MESs). An MDBS offering CDPD services helps a roaming MES register with the MDIS with which the particular MDBS is associated by acting as a conduit for the registration message. An MDIS that handles the registration is referred to as the serving MDIS. Upon receiving the registration message from the MDBS, the serving MDIS informs the home MDIS of the MES of the latter's presence in its coverage area. When a host needs to send data to an MES, it does not have to be aware of the mobility aspect of the MES; it simply transmits data using the MES's IP address as the destination address. The encapsulated data packets for the MES are forwarded to the serving MDIS of the MES. At the serving MDIS, packets are decapsulated to reveal the MES's address. The serving MDIS sends the original data packets to the right channel where the MES is currently located. The MES receives the data packets. If the MES needs to reply, it directly sends data packets using the remote host's IP address as the destination address. CDPD systems are further described in K. Budka et al., "Cellular Digital Packet Data Networks." Bell Labs Technical Journal, Vol. 2, No. 3 (Summer 1997); "Cellular Digital Packet Data Systems Specification: Release 1.1," CDPD Forum, Inc., Chicago (1995); and M. S. Taylor et al., "Internet Mobility: The CDPD Approach," Prentice Hall PTR, Upper Saddle River, N.J. (1996).

With automobiles being the primary mode of transportation for many individuals and organizations, access to real-time traffic information is desired. Traffic information is a combination of several different types of data, such as for example, the number of vehicles on certain road segments, the average speed of the vehicles, and occurrence of accidents. Currently, traffic information is gathered through means such as television cameras disposed at primary points of a road, or through cameramen and reporters in helicopters. As a result, traffic information is available only for certain roads and is not frequently updated. A way of providing travelers with traffic-related information that would minimize travel time or provide certain information regarding a current or intended route is desirable.

SUMMARY

A system and a method for determining and disseminating current traffic information and/or route information are provided. For example, in accordance with one embodiment of the present invention, a traffic data compilation computer linked to a data network collects location data from a plurality of mobile units, each of which is associated with an identification number. The traffic data compilation computer compiles the location data, calculates the velocity of each mobile unit, compares the velocity of each mobile unit against speed limit data stored in a memory, and stores the difference. The difference may be stored in a database, for example in a database indexed by mobile unit identification number. Based on the difference, the traffic data compilation computer determines traffic conditions surrounding each of the mobile units. Upon receiving a request for traffic information from a user, the traffic data compilation computer retrieves traffic data pertaining to a desired geographic area and transmits a traffic, level indicator to the user. The user communicates with the traffic data compilation computer through a visual and/or audio interface device coupled to a mobile unit.

In addition, in accordance with another embodiment of the present invention, the traffic data compilation computer may examine alternative routes and determine the fastest route between point A and point B under current traffic conditions. In determining the fastest route, traffic data compilation computer determines the possible routes between point A and point B, retrieves velocity data from a database, and derives the estimated travel time for each of the possible routes. The traffic data compilation computer may calculate an accuracy indicator and present it to a user along with traffic information, or along with the estimated travel time. Optionally, traffic data compilation computer may supplement the fastest route or traffic information with predictive data based on a statistical analysis of past traffic patterns, or with marketplace data from third party sources such as radio broadcast, websites, or reports. A user may be allowed to report events to the traffic data compilation computer using an interface device.

In accordance with another embodiment of the present invention, systems and methods are provided to monitor a location of one or more mobile devices and provide information relevant to the location of the mobile device. For example, the mobile device may be monitored to determine if it follows a prescribed route or enters a prohibited area or section of road. As a specific example in accordance with one embodiment of the present invention, the mobile device is associated with a vehicle transporting hazardous material. The mobile device (e.g., tethered to the hazardous material container or traveling with the vehicle) provides location information to a location server via a wireless network. The location server, having access to hazardous material rules for a given location of the mobile device and access to the type of hazardous material being transported, can determine, for example, if the mobile device is traveling along a route or a section of road that prohibits the particular hazardous material being transported. The location server may notify a designated party or appropriate authorities of the violation and may further provide directions or a map for exiting the prohibited area.

More specifically, in accordance with one embodiment of the present invention, a system for determining transportation violations of a hazardous material includes a data processor; and a database couplable to the data processor, the database adapted to store hazardous material rules corresponding to geographic locations, wherein the data processor is adapted to compare the hazardous material rules to location information provided by mobile devices associated with hazardous materials to determine any violation of the hazardous material rules.

In accordance with another embodiment of the present invention, a method of determining a hazardous material transportation violation includes receiving location data from a mobile unit over a data network; retrieving hazardous material rules based on the location data; and comparing the hazardous material rules with a hazardous material being transported with the mobile unit to determine if the hazardous material rules are violated.

In accordance with another embodiment of the present invention, a system includes a plurality of mobile devices each adapted to provide location data through a wireless communication network; and means for receiving the location data through a data network couplable to the wireless communication network and for comparing hazardous material rules for geographic areas with the location data for at least one of the mobile devices which is associated with a hazardous material.

In accordance with another embodiment of the present invention, a method of determining a hazardous material transportation violation includes determining a location of a mobile device; retrieving hazardous material rules based on the location; and determining if the hazardous material rules are violated based on the location and a hazardous material being transported with the mobile device.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

FIG. 5 depicts a road segment database a processing unit may use to determine the estimated travel time on specified routes.

The preferred embodiments of the present invention and their advantages are best understood by referring to the detailed description that follows.

DETAILED DESCRIPTION

Figure 1:
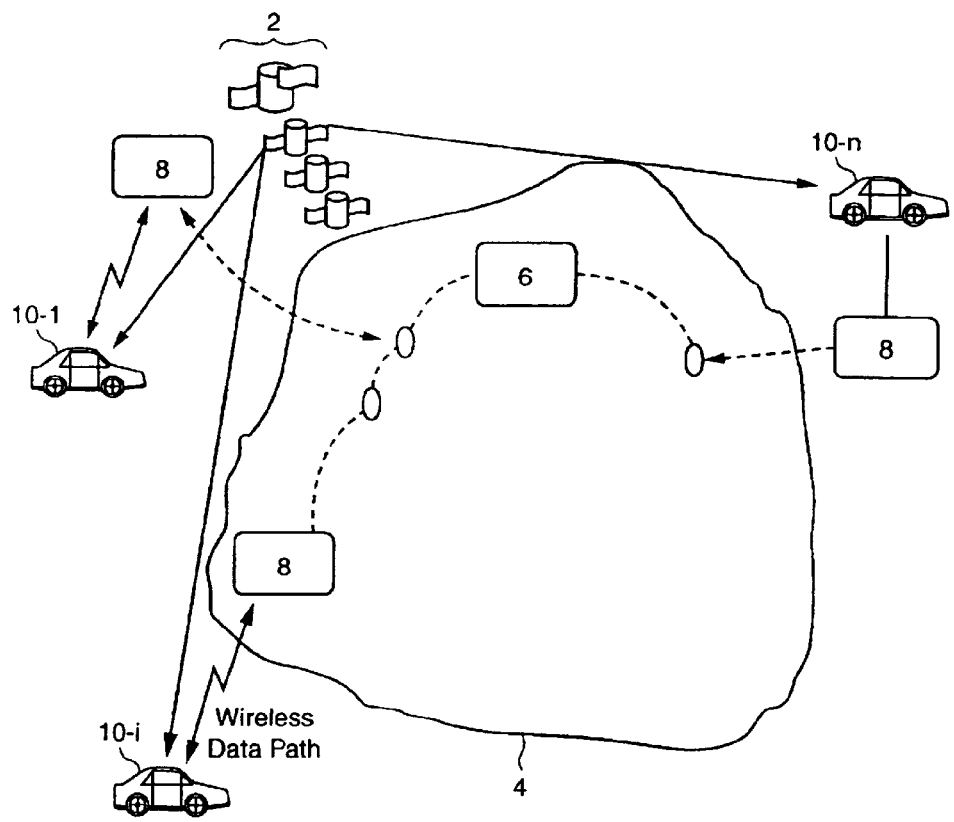
FIG. 1 depicts a system for collecting, determining, and disseminating traffic information in accordance with an embodiment of the present invention.

FIG. 1 provides an overview of one embodiment of the location-based traffic information system 1 in accordance with the present invention. The embodiment of FIG. 1 includes GPS satellites 2, data network 4, service computer 6, wireless communication network 8, and vehicles **10-*l* through 10-*n*. Vehicle 10-*i* is one of vehicles 10-*l* through 10-*n*, n being the number of vehicles that are part of traffic information system 1. Although FIG. 1 shows vehicles 10-*l* through 10-*n* as being automobiles, vehicle 10-*i* may be a truck, a motorcycle, a bus, a trailer, or any other vehicle. Data network 4 may be, for example, the Internet. Wireless communication network 8 may be but is not limited to CDPD, GPRS, GSM, iDEN, AMPS, 1XRTT, IEEE 802.11, or CDMA. Although the exemplary embodiment uses GPS satellites 2** to determine locations, any alternative location determining method can be used within the scope of the present invention.

Figure 2:
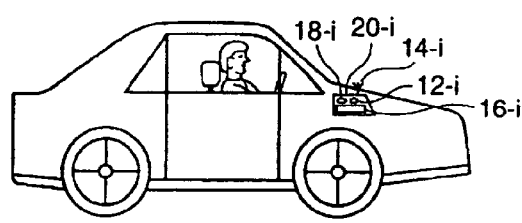
FIG. 2 depicts a vehicle carrying a user and a mobile unit in accordance with an embodiment of the present invention.

As FIG. 2 shows, each vehicle **10-*i* is equipped with mobile unit 12-*i*. Mobile unit 12-*i* receives commands and/or input from user 22-*i* through a user interface device (not shown), such as a computer, a personal digital assistant (PDA), or a wireless telephone coupled to user interface device port 18-*i*. Alternatively, the user interface device may be a monitor unit and/or a sound system installed in vehicle 10-*i*. User 22-*i* may enter a request and/or a geographic specification such as a route, a street name, or a fixed or floating radius into mobile unit 12-*i* using the user interface device. Optionally, user 22-*i* may be able to input traffic information, for example report an accident, through the user interface device. If the user interface device allows graphic display, user 22-*i* may be able to select an area on a map he wants to obtain information for, or "select out" an area he is not interested in. Depending on the user interface device, user 22-*i*** may enter and receive data in the form of sound, graphics, or a combination thereof.

In some embodiments, user **22-*i*** may be able to change his selection of user interface device as frequently as he desires, among a number of devices available to him. For example, he may designate a monitor unit installed in his car as the user interface device when he is driving, but designate his computer or his wireless phone as the user interface device when he is not in his car.

As used herein, "outbound package" refers to data sent from mobile unit **12-*i* to service computer 6, and "inbound package" refers to data sent from service computer 6 to mobile unit 12-*i*. Both an outbound package and an inbound package are sent through wireless communication network 8 and data network 4**.

Mobile unit **12-*i* includes a GPS code receiver 14-*i*, a transmitter 16-*i*, a user interface port 18-*i*, and a processor 20-*i*. GPS code receiver 14-*i* of mobile unit 12-*i* receives GPS code sequences from GPS satellites 2. Processor 20-*i* converts the GPS code sequences to location data. GPS code receiver 14-*i* searches frequency channels and receives code sequences from GPS satellites 2. Transmitter 16-*i* transmits the location data to data network 4 at a regular time interval, for example every time GPS code receiver 14-*i* receives a new set of codes, or upon receiving a command from the user. The information which user 22-*i* enters into the user interface device is converted to an outbound package by processor 20-*i* and transmitted to data network 4 by transmitter 16*i*. The GPS code sequences received by receiver 12-*i* are converted to location data package by processor 20-*i* and is transmitted to data network 4 by transmitter 16-*i*. When transmitter 16-*i* transmits a package to data network 4**, the package is automatically labeled with an identification code, e.g. an IP address or a "cookie", which identifies the vehicle whose location is being transmitted.

Whether mobile unit **12-*i* is installed in vehicle 10-*i* or simply placed inside vehicle 10-*i*, transmitter 16-*i* may be coupled to the engine of vehicle 10-*i* so that it automatically turns on and off with the engine. By automatically turning off with the engine, transmitter 16-*i* is prevented from erroneously reporting a parked vehicle as a vehicle in heavy traffic and adversely affecting the accuracy of the traffic data. In addition, transmitter 16-*i* is also equipped with a manual power switch so that user 22-*i* can prevent the transmission of location data to service computer 6** when he is doing something other than traveling, for example waiting for a friend outside a building with his engine running.

Figures 3, 4:
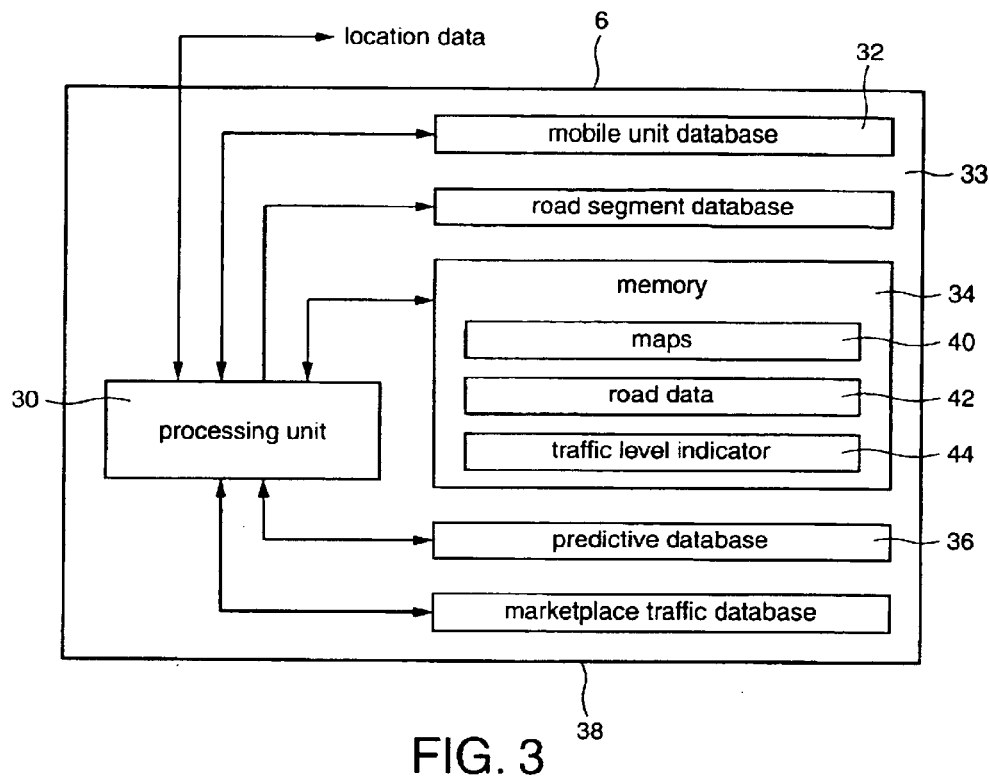
FIG. 3 depicts a computer which collects, determines, and disseminates traffic information in accordance with an embodiment of the present invention.
FIG. 4 depicts a mobile unit database a processing unit may use to determine the current traffic condition in accordance with an embodiment of the present invention.

FIG. 3 shows that service computer 6 includes processing unit 30, which receives location data and outbound packages. Processing unit 30 may be made using a general purpose computer, such as a mainframe computer, or a computer system including a database server and a web page server. Processing unit 30 is coupled to mobile unit database 32, road segment database 33, memory 34, predictive database 36, and marketplace traffic database 38. Service computer 6 uses the received location data to compute the velocity of each mobile unit, which is stored in mobile unit database 32. Mobile unit database 32, which may be indexed by mobile units **12-*l* through 12-*n***, tracks the location and velocity of each mobile unit in the system. Details on the method of determining location data using GPS code sequences is provided in U.S. Pat. No. 5,959,577 to Rodric Fan, et al entitled "Method and Structure for Distribution of Travel Information Using Network," which is herein incorporated in its entirety.

Road segment database 33 is used by processing unit 30 to estimate the travel times from point A to point B, either on a route provided by user **22-*i* or on a route selected by processing unit 30**. A "road segment," as used herein, is a strip of a street or an entire street having a same continuous speed limit.

Memory 34 stores maps 40, road data 42, and level indicators 44. As Memory 34 contains data that is not frequently updated. CD-ROM may be used to implement memory 34. Road data 42 include data such as speed limits and locations of traffic lights, stop signs, one-way streets, gas stations, and toll booths. Road data 42 may also include information regarding toll, number of lanes, and presence of carpool lanes for road segments contained in maps 40. Level indicators 44, which are described in further details below, indicate how heavy the traffic is based on the difference between the speed limit and the average velocity of the vehicles in the specified area. Level indicators 44 may be but is not limited to colors or numbers indicating a certain traffic condition. For example, black, red, purple, yellow, and green dots may be used to indicate a travel speed that is greater than 30 mph below the speed limit (i.e., very heavy traffic), 20–29 mph below the speed limit (i.e., moderately heavy traffic), 10–19 mph below the speed limit, between the speed limit and 10 mph below the speed limit, and higher than the speed limit, respectively.

Predictive database 36 contains historical traffic data for a predetermined time frame (e.g., three days) and traffic pattern data under typical conditions. Traffic pattern data may be based on, for example, a daily or weekly cycle. Historical traffic data allows user 22-$i$ to look up information such as the average travel speed on Bay Street two days ago at 2 p.m. Traffic pattern data allows user 22-$i$ to look up information such as the average travel speeds on Bay Street at 8 a.m. on a typical Monday. Predictive database 36 does not provide information based on current situation, but on past patterns. User 22$i$ may use predictive database 36 for future planning purposes or to provide directions to another person. Processing unit 30 may use predictive database 36 when it has to select routes that are usually the fastest, as discussed further below in reference to FIG. 12.

Marketplace traffic database 38 contains traffic information obtained without using the automatic reporting of current location by mobile units 12-$l$ through 12-$n$. For example, if processing unit 30 is made to search certain websites, marketplace traffic database 38 may contain the information found on a traffic report website or a news website. In addition, if a particular embodiment provides user 22-$i$ with an option to report traffic data, any data entered by user 22-$i$ under that option may be stored in marketplace traffic database 38.

FIG. 4 shows an exemplary table 28 which is indexed by mobile units and used by processing unit 30 to maintain the location and velocity data. Table 28 may be, for example, a part of mobile unit database 32. In addition to the parameters shown in FIG. 4, table 28 may also contain information provided by users 22-$l$ through 22-$n$ during the initial registration process. Service computer 6 stores data regarding user 22-$i$, vehicle 10-$i$, and mobile unit 12-$i$ entered during the registration process in a database, for example in table 28. Data regarding user 22-$i$ may include information such as name, address, telephone number, and e-mail address. Data regarding vehicle 10-$i$ may include the make and model of vehicle 10-$i$, gas tank size, miles traveled, gas mileage, and license plate number. Data regarding mobile unit 12-$i$ includes a serial number or some type of identification number associated with mobile unit 12-$i$. In addition, user 22-$i$ may provide a list of device which he plans to use as the user interface device so that service computer 6 may provide him with a customized selection list of user interface devices.

Column 50 of table 28 lists vehicles 10-$l$ through 10-$n$ whose users 22-$l$ through 22-$n$ registered with system 1. Column 51 lists the most recent locations received from vehicles 10-$l$ through 10-$n$. Column 51 may list the last few locations that were received, as well as the most recent location. After calculating the velocity (i.e., speed and direction) of each vehicle, processing unit 30 stores the actual velocities of each vehicle in column 52. Based on the geographic specification entered by user 22-$i$, processing unit 30 retrieves from memory 34 the speed limit of the road segment where vehicle 10-$i$ is currently traveling. The retrieved speed limit is stored in column 53. Processing unit 30 calculates the difference between actual velocity (column 52) and speed limit (column 53), and stores the difference in column 54. Processing unit 30 uses the values in column 54 to select a traffic level indicator that accurately represents the traffic condition in the road segment the vehicle is traveling, from level indicator database 36. The traffic level indicator is encapsulated in an inbound package and sent, via data network 4 and wireless communication network 8, to mobile unit 12-$i$. User 22-$i$ views or hears the content of the inbound package through a user interface device.

Table 28 may also contain mileage information 26, which tracks the number of miles traveled by vehicle 10-$i$. During registration, user 22-$i$ enters the odometer reading of vehicle 10-$i$ at the time of registration. Based on the mileage information entered by user 22-$i$, server computer 6 keeps track of the total distance traveled by vehicle 10-$i$ and may send a reminder to user 22-$i$ when it is time for a maintenance check-up. In some embodiments, service computer 6 may also keep track of the gas level in the gas tank of vehicle 10-$i$ and send alerts when the gas level is below a minimum value.

FIG. 5 depicts an exemplary table 41 which, unlike table 28, is indexed by road segments. Table 41 may constitute a part of road segment database 33. As table 41 tracks traffic conditions on each road segment, table 41 is useful for estimating travel times on a selected route. Each road segment that is contained in maps 40 has an identification number, which is entered in column 56 of table 41. Column 57 tracks the number of mobile units that are currently in the road segment identified in column 56. In addition, column 57 may track the identity of each mobile unit that is traveling the road segment identified in column 56. Processing unit 30 obtains the current velocities of each of those mobile units using mobile unit database 32, computes the average velocity, and records the average velocity in column 58. As some road segments are not frequently traveled and there may not always be a "current" velocity available for each road segment, column 59 records an average time elapsed since the last update. Values in column 59 may be, for example, averages of total time elapsed for each of the mobile units traveling in the particular road segment. Column 60 records the length of each road segment identified in column 56. As the length of each road segment is stored in memory 34, for example as a part of road data 42, processing unit 30 may transfer the parameter from road data 42 to column 60. Using average speed stored in column 58 and length of segment in column 60, processing unit 30 computes the estimated travel time, which it stores in column 61.

Figure 6:
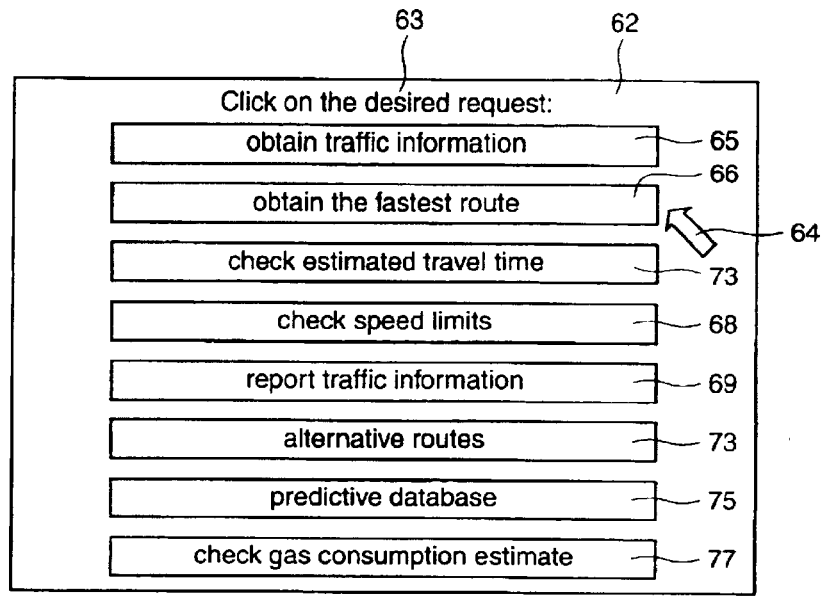
FIG. 6 depicts an image a user may see upon turning on a user interface device coupled to a computer that determines and provides current traffic information in accordance with an embodiment of the present invention.

FIG. 6 shows an exemplary option panel 62 which user 22-$i$ may see on a graphic user interface device upon powering on mobile unit 20-$i$. Option panel 62 includes prompt 63, which asks user 22-$i$ to enter a request. Depending on the user interface device, user 22-$i$ may simply select one of the provided options using indicator 64, speak, or type in a response. Option panel 62 provides user 22-$i$ with options: option 65 to obtain traffic information, option 66 to obtain the fastest route under current traffic conditions, option 67 to check estimated travel time on a specific route, option 68 to check speed limits for a geographic area, option 69 to report traffic information, option 73 to obtain alternative routes, option 75 to access predictive database 36, and option 77 to check gas consumption estimate between two geographic locations. The eight options in FIG. 6 are illustrative, not exhaustive.

Figure 7:
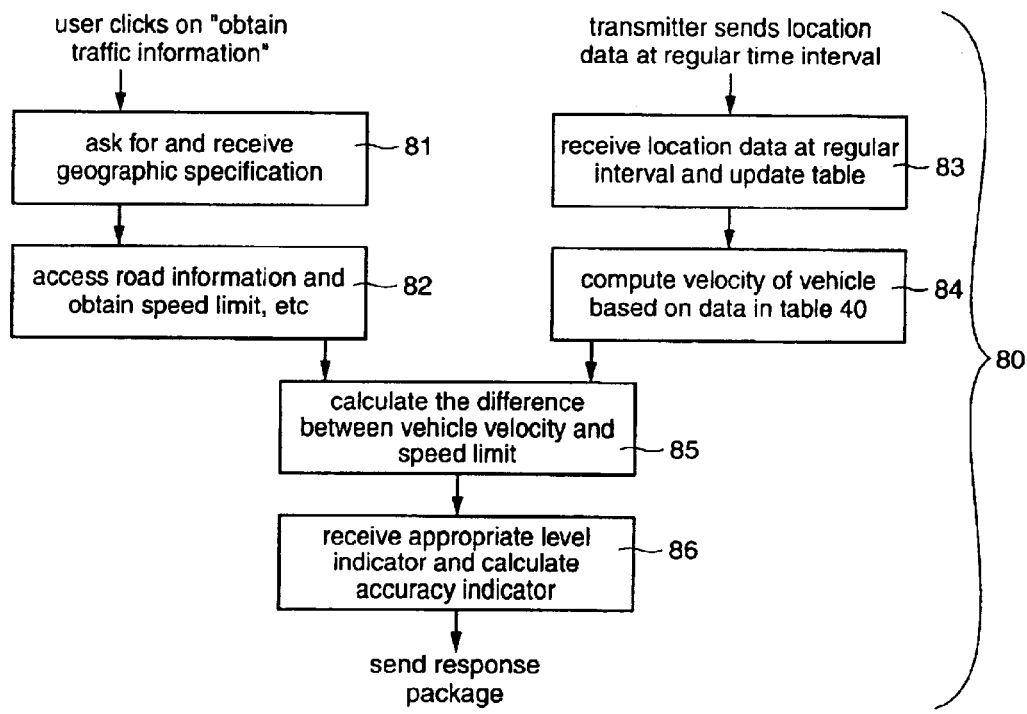
FIG. 7 depicts the process that a processing unit executes in order to collect and determine the current traffic condition in accordance with an embodiment of the present invention.

FIG. 7 depicts process 80, which is triggered when user 22-$i$ selects option 65 to obtain traffic information and the selection is transmitted to processing unit 30 by transmitter 16$i$. As indicated in stage 81, processing unit 30 prompts user 22-$i$ to specify a geographic area for which she wants the traffic information. In some embodiments, user 22-$i$ may be allowed to provide the geographic specification in more than one format, for example as street names or a radius. If geographic specification is a radius, it may be a fixed point, for example "five mile radius around the intersection of Bay Street and Market Street," or a floating point, for example "five mile radius around my current location." Upon receiving a geographic specification from user 22-$i$, processing unit 30 accesses road information 42 from memory 34 in stage 82. By accessing road data 42' processing unit 30 obtains information such as speed limit, whether the street is a residential street, a major street, or a highway, and the number of traffic lights and/or stop signs. Separately from stages 81 and 82, stage 83 occurs whereby processing unit 30 receives location data from mobile units 12-*l* to 12-*n* at a regular time interval and uses the location data to update table 28. Processing unit 30 calculates the velocity of each of the mobile units 12-*l* to 12-*n* in stage 84, and calculates the difference between the obtained velocity and the speed limit in stage 85. In stage 86, processing unit 30 retrieves a traffic level indicator 44 which represents the traffic condition surrounding the particular mobile unit from which location data was received.

Figure 8:
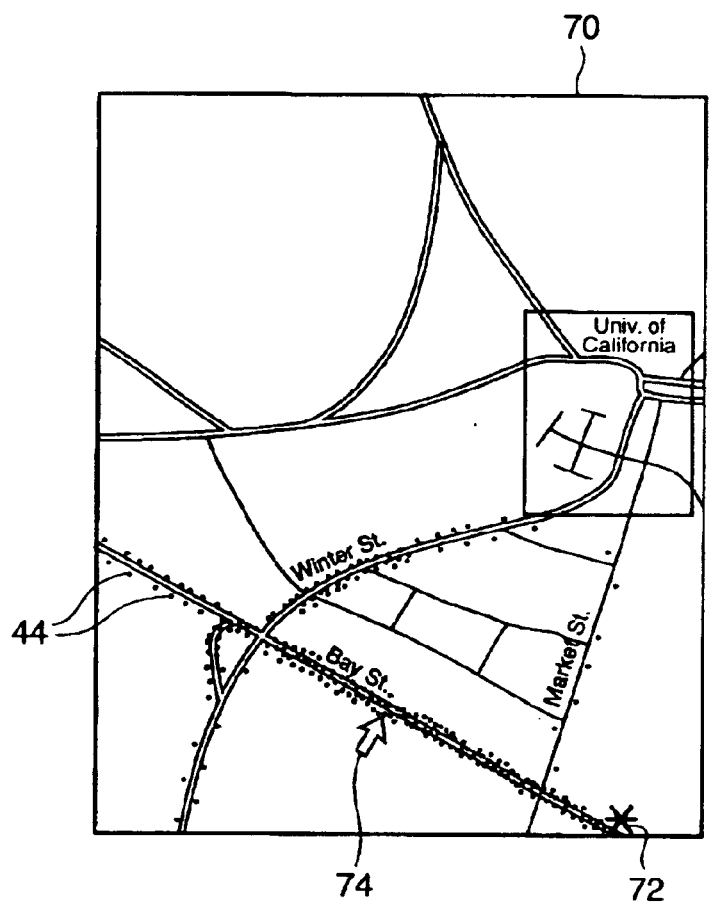
FIG. 8 depicts an image which a user may see on a graphic user interface device in response to a request for traffic information.

After repeating stages 81, 82, 83, 84, and 85 for every mobile unit 12-*i* currently located within the specified geographic area, processing unit 30 calculates an accuracy indicator, or a value that indicates the accuracy of data. The accuracy indicator may take into account the number of data points from which the average speeds were derived, consistency of the data with historical patterns, maximum-minimum spread between the fastest and the slowest vehicle in the relevant road segment, or the standard deviation (stage 86). Processing unit 30 creates an inbound package which contains data that may be responsive to the outbound package, and transmits it to mobile unit 12-*i* which is the source of the outbound package. An inbound package may be transmitted to more than one mobile unit at once., FIG. 8 depicts an exemplary image 70 that user 22-*i* may see on a graphic user interface device when processor 20-*i* of mobile unit 12-*i* decapsulates the inbound package and sends it to mobile unit 12-*i*. Image 70 includes traffic level indicators 44 superimposed on a map of the specified geographic area. In the example shown in FIG. 8, each of the dark dots (which may appear as red dots on a color display) indicate a vehicle traveling at more than 30 mph below the speed limit of the street, and each of the white dots (which may appear as green dots on a color display) indicate a vehicle traveling at a speed above the speed limit. Thus, user 22-*i* can see that Bay Street and a segment of Winter Street are heavily congested while traffic flow is fast on Market Street. Thus, if user 22-*i* is headed to University of California, user 22-*i* will know to avoid Bay Street and Winter Street based on image 70. Mark 72 on image 70 indicates an accident. Processing unit 30 can be programmed to send accident notifications upon detecting abnormal change in velocity, such that accident sites are indicated with mark 72 within a short period of time (e.g., 30 seconds) after the accident. Further details on accident detection and notification are provided in U.S. Pat. No. 6,459,988 to Rodric Fan, et al entitled "Method and System for Detecting Vehicle Collision Using Global Positioning System," which is herein incorporated by reference. With reference to image 70, mark 72 indicates that an accident may be responsible for the slow-moving traffic on Bay Street.

Figure 9:
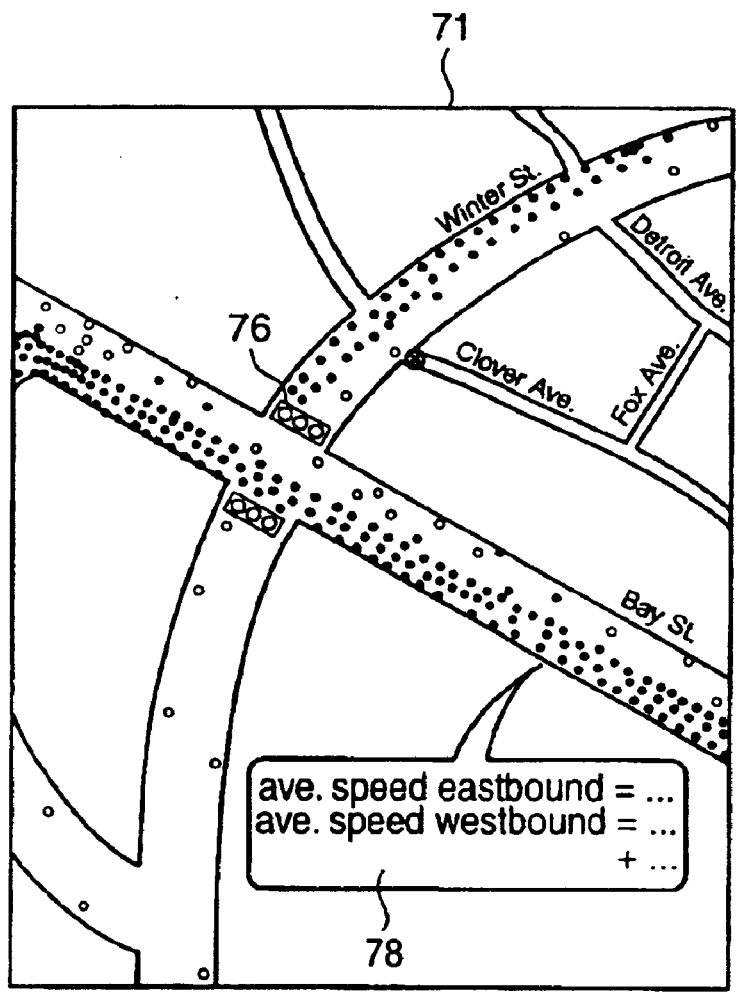
FIG. 9 depicts a zoomed-in version of the image in FIG. 8 with a detailed traffic report superimposed.

FIG. 9 shows zoomed-in image 71, which reveals more details about the traffic congestion on Bay Street. Zoomed-in image 71 may be accessed, for example, by using arrow 74 of image 70 to click on a spot that user 22-*i* wants to zoom-in on. Zoomed-in image 71 indicates that congestion is worse on Bay Street only in the eastbound lanes, and that traveling westbound on Bay Street may not be so bad. Also, traffic light 76 at the corner of Winter Street and Bay Street may be responsible for the heavy traffic on the part of Winter Street closest to Bay Street Data about traffic light 76 causing congestion would be useful for a city or locality that is responsible for controlling the traffic lights to provide optimum traffic flow. Box 78 of zoomed-in image 71 provides the average travel speed and the standard deviation on the spot user 22-*i* clicked on with arrow 74. Depending on the embodiment, image 70 or zoomed-in image 71 can provide more, less, or different data than the exemplary embodiment shown in FIG. 8 and FIG. 9.

Figure 10:
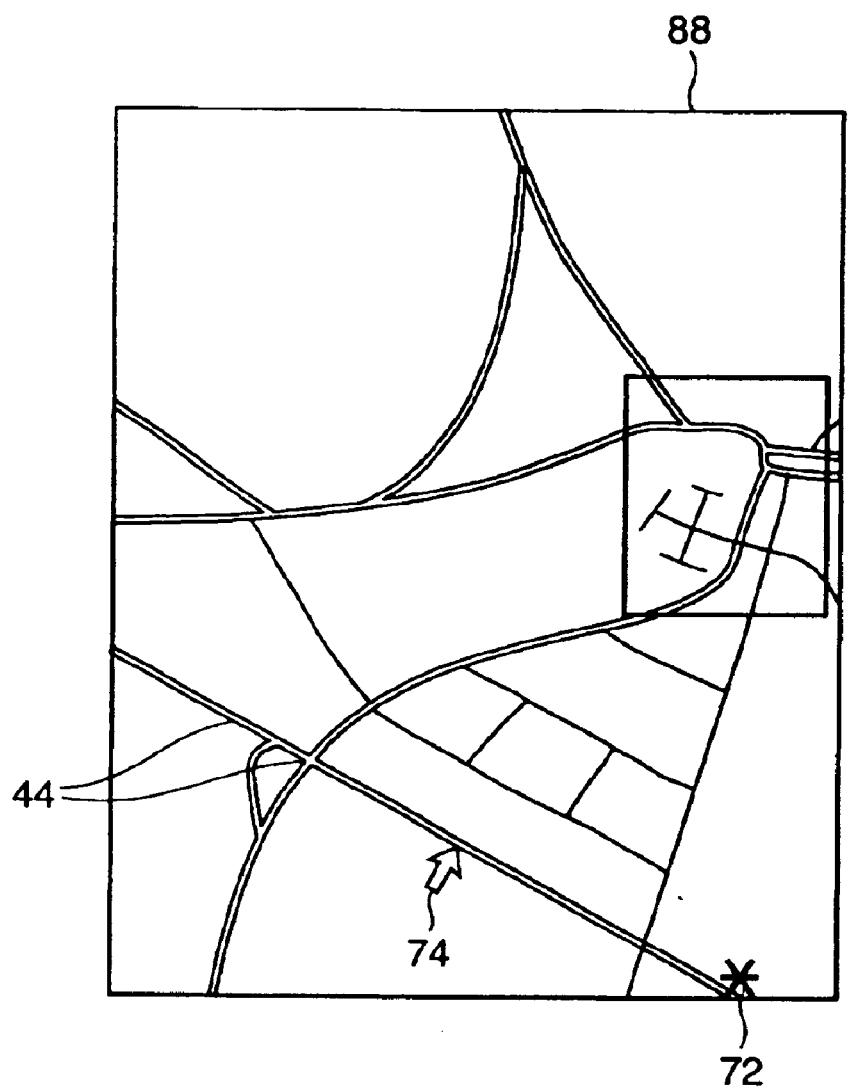
FIG. 10 depicts an alternative embodiment of the image in FIG. 8, using a different type of traffic level indicator.
Figure 11:
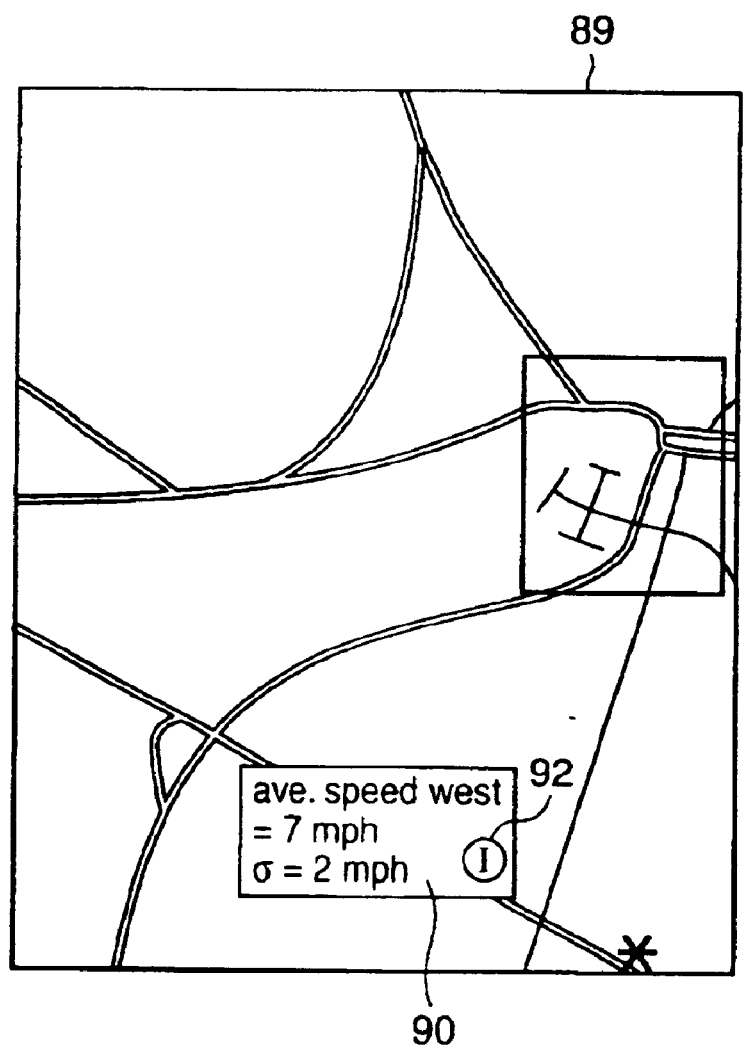
FIG. 11 depicts how a detailed traffic report may be provided in the alternative embodiment of FIG. 10.

FIG. 10 shows image 88 with an alternative traffic level indicator 44. Instead of the dots of the embodiment depicted in FIG. 8, the embodiment in FIG. 9 color-codes the roads. Thus, Bay Street is colored dark (red) instead of being covered with dark dots. When user 22-*i* clicks on arrow 74 to obtain more information about Bay Street, box 90 may pop up at the clicked spot, providing information such as the average speed and the standard deviation, as in image 89 of FIG. 11. The information provided by image 88 and image 89 may be accompanied by or replaced with sound or speech, depending on the type of user interface device. For example, if the user interface device is a wireless telephone with a small graphic display, much of the communication between the device and user 22-*i* may include pressing the number buttons or sound. Optionally, image 70 or zoomed-in image 71 can provide an indicator, such as the circled "1" 92, if there is recent data in marketplace traffic information database 38.

Figure 12:
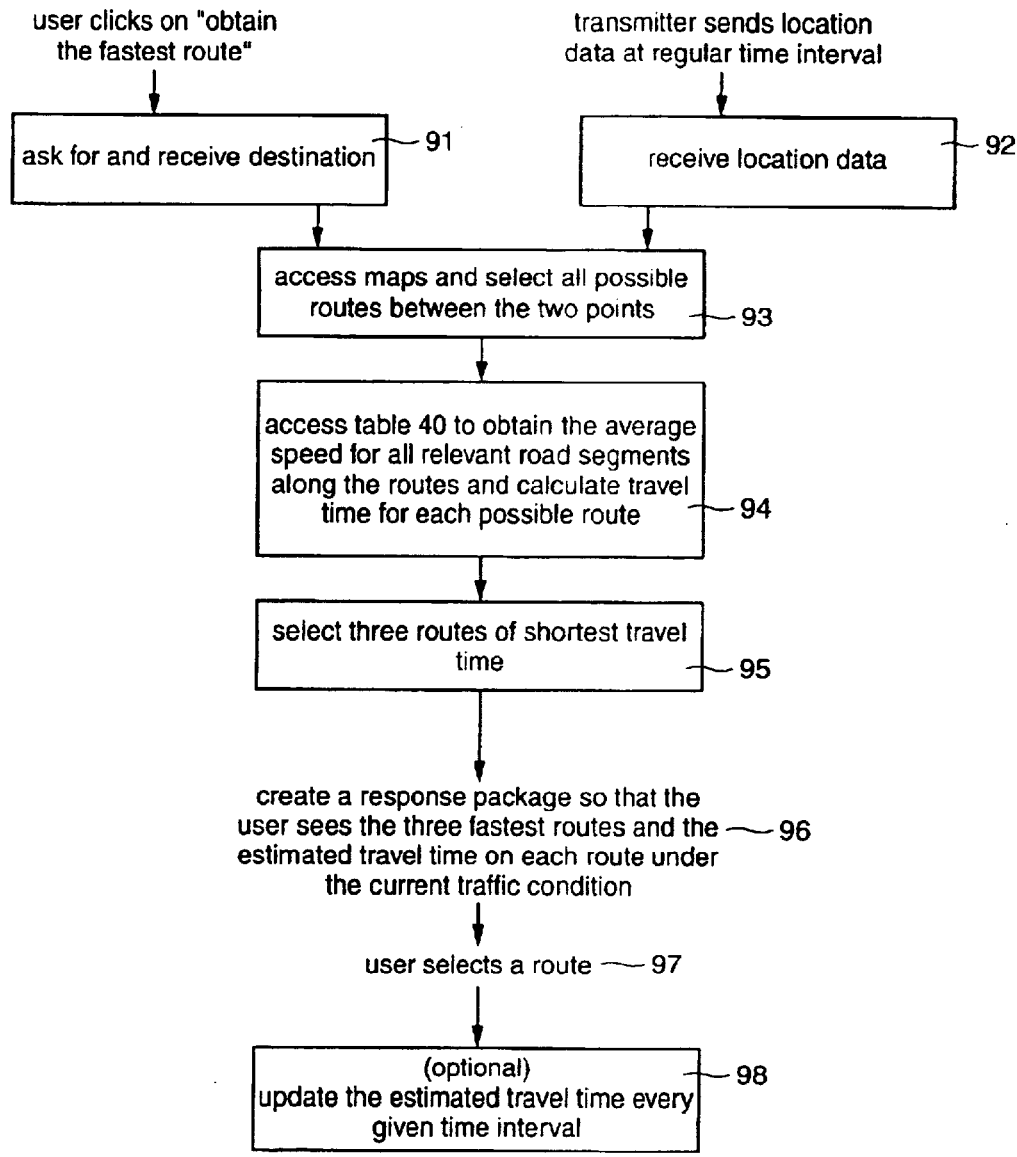
FIG. 12 depicts the process that a processing unit executes in response to a request for the fastest travel route to a specified destination under the current traffic condition in accordance with an embodiment of the present invention.

FIG. 12 depicts the process which is triggered if user 22-*i* selects option 66 to obtain the fastest route in option panel 62 of FIG. 6. Upon receiving the selection, processing unit 30 transmits an inbound package asking for a geographical specification, such that user 22-*i* sees a prompt on the graphic display of a user interface device. The prompt may provide user 22-*i* with the option of entering a starting point and a destination, or just a destination. In the latter case, processing unit 30 may assume that the starting point is the current location of vehicle 10-*i*, which it can retrieve from mobile unit database 32. In stage 93, processing unit 30 accesses maps 40 and determines the possible routes between the starting point and the destination. User 22-*i* may limit the number of possible routes, for example to five routes, in which case processing unit 30 would have to rely on predictive database 36 to select the five routes which would lead to the shortest travel time absent a non-routine occurrence, such as an accident or construction. In stage 94, processing unit 30 accesses table 28 and table 41 and collects data from vehicles on all the routes determined in stage 93. In stages 94 and 95, processing unit 30 determines the travel time for each route by adding up the average travel time of all segments along each of the routes, and selects a predetermined number of routes, for example three routes, which are associated with the shortest travel time under the current traffic conditions. Processing unit 30 creates an inbound package and transmits it to mobile unit 12-*i*, processor 20-*i* of which converts the format into one that is appropriate for the user interface device. User 22-*i* receives the information about the routes of shortest travel time. Optionally, user 22-*i* may select one of the routes, and processor 20-*i* may be connected with a navigator so that it can provide driving directions to user 22-*i* along the selected route. A navigator that can provide real-time driving directions is disclosed in U.S. Pat. No. 6,026,346, which is herein incorporated by reference.

Figure 13:
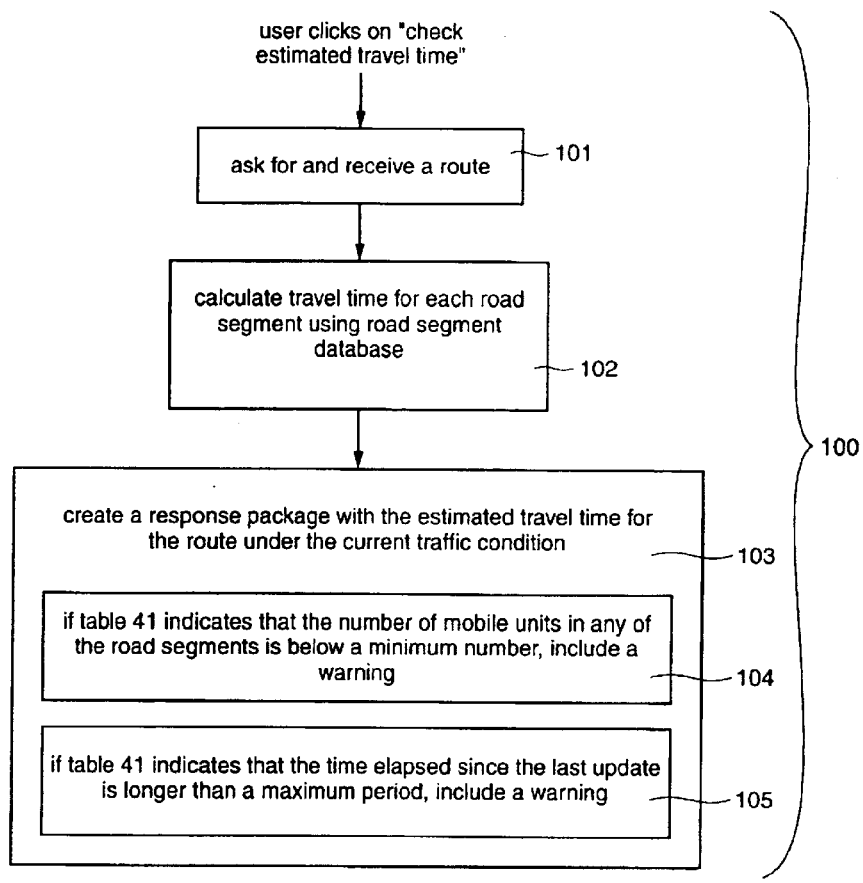
FIG. 13 depicts the process that a processing unit executes in response to a request for estimated travel time from point A to point B under the current traffic conditions.

FIG. 13 depicts a process 100 which is triggered if user 22-*i* selects option 67 to check the estimated travel time in option panel 62 of FIG. 6. Upon receiving the selection, processing unit 30 enters stage 101 and transmits an inbound package asking for a geographical specification, such as a route. Upon receiving a geographical specification, processing unit 30 accesses table 41, column 61 of which records the estimated travel time for each road segment under the current traffic conditions. In stage 102, processing unit 30 adds up the estimated travel time for each road segment or portion of road segment along the specified route. In stage 103, processing unit 30 creates an inbound package with the sum. Sub-stages 104 and 105 indicate that if the number of mobile units on a road segment in column 57 is below a predetermined minimum number, or if the average time elapsed since the last update (column 59) exceeds a certain maximum value, the inbound package may contain an accuracy warning. The accuracy warning may be a phrase or a mark indicating that the accuracy is low due to a part of the route being infrequently traveled by mobile units of the system. Alternatively, the accuracy warning may include a time range, such as the estimated travel time assuming the worst case scenario (heavy traffic) on the road segments that do not have sufficient data. Other embodiments may indicate the degree of accuracy with a number associated with the length of the road segment responsible for the lower accuracy.

Sometimes, user 22-$i$ may select option 68 to check speed limits or to find out road types (e.g., residential, highway, etc.) for certain routes, irrelevant of current traffic conditions. Upon receiving option 68, processing unit 30 may request a geographic specification, such as a route or a radius. Upon receiving a response, processing unit 30 retrieves the speed limit information from memory 34, superimposes the information on a map of the specified geographic area, and creates an inbound package. In some embodiments, option panel 62 may allow user 22-$i$ to request any information in road data 42, such as the number of traffic lights along certain routes.

If user 22-$i$ selects option 69 to enter traffic information, processing unit 30 may provide user 22-$i$ with options, such as "accident," "construction," or "blocked." Depending on the embodiment, user 22-$i$ may be limited to selecting one of the options and providing a geographic specification, or may be allowed to enter additional data. The selection or the data is transmitted to processing unit 30, which then stores the data in marketplace traffic database 38.

If user 22-$i$ selects option 73, thereby requesting service computer 6 to provide alternative routes between two geographic locations, a process similar to the process in FIG. 12 is triggered. In some embodiments, user 22-$i$ may be able to specify different criteria that reflect his preferences, for example a route with minimum number of traffic lights, the fastest route, or a freeway route. Depending on the preference specified by user 22-$i$, stage 95 of FIG. 12 is adjusted. User 22-$i$ may select option 75 to access predictive database 36, to obtain historic data or traffic pattern data.

Figure 14:
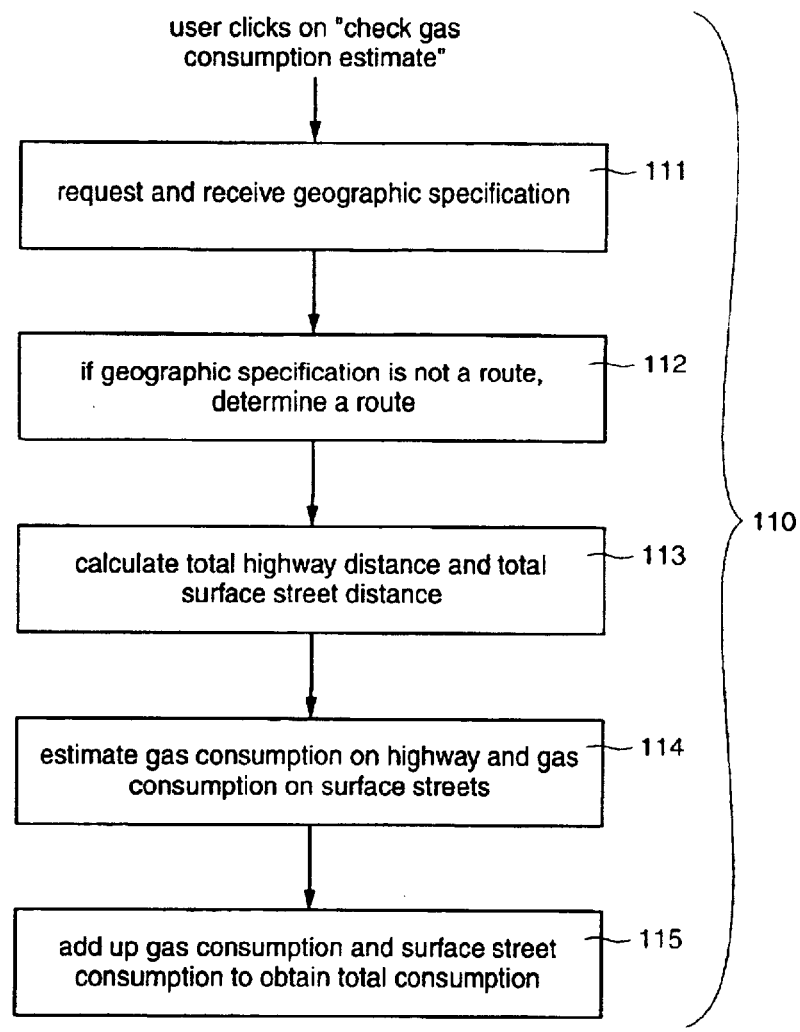
FIG. 14 depicts the process that a processing unit executes in response to a request for an estimate of gas consumption in traveling from point A to point B under typical traffic conditions.

FIG. 14 provides process 110, which is triggered when user 22-$i$ selects option 77 to get an estimate of gas consumption in traveling from one geographic location to another. Upon making the selection, processing unit 30 prompts user 22-$i$ to enter a geographic specification, in stage 111. If user 22-$i$ provides the geographic specification in a form other than a specific route, processing unit 30 determines the route in stage 112, which includes a process similar to the process in FIG. 12. Once the route is determined, processing unit 30 accesses road data 42 to categorize the roads along the route into highways and surface streets, and separately adds up the distances of all road segments that constitute the highways and all road segments that constitute the surface streets, in stage 113. In stage 114, processing unit 30 pulls the miles-per-gallon information from table 28 and estimates a sum of the number of gallons vehicle 10-$i$ will use to travel the highways and the number of gallons vehicle 10-$i$ will use to travel the surface streets. The sum calculated in stage 115, indicates an estimated number of gas consumption.

One or more embodiments of the present invention may also be employed to monitor vehicles that, for example, are to follow a defined route, are prohibited from traveling along certain routes or road segments, or are regulated in some fashion. For example (referring to FIGS. 1 and 2), location data from mobile unit 12-$i$ may be utilized to monitor associated vehicle 10-$i$ that is transporting hazardous materials (hazmat). If vehicle 10-$i$ deviates from its intended or prescribed route or is on a route or will soon be entering an area (e.g., a road, a portion of a road, a road segment, or a geographic zone) that prohibits the transportation of the particular hazardous material carried by vehicle 10$i$, service computer 6 may issue an alert or notification to a designated party (e.g., user 22-$i$, owner of vehicle, supervisor of user 22-$i$, and/or authorities, which may include local, state, or federal authorities).

As an example, road data 42 of FIG. 3 may include information on whether hazardous materials may be transported and the types of hazardous materials that can be transported for a given route or a road or a portion of a road contained in maps 40. The road or portion of a road may, for example, be similar to road segment defined herein, such as or similar to what is stored in road segment database 33, or where the road segment is defined or based on a strip of a street or an entire street having a same prohibited or allowed hazardous material classification. Road data 42 may also include information on the route or road (or portion) as to whether the route is a prescribed or preferred route based on the type of hazardous material. For example, the Federal Motor Carrier Safety Administration currently lists ten categories of hazardous materials that can be restricted or prohibited along routes and lists five categories of routes for prescribed or preferred routes throughout the United States. This type of information may be stored in road data 42 along with, for example, any other related information such as time or date restrictions or other regulatory information pertaining to a route or road. Alternatively, rather than store the information in road data 42, a separate database may be stored by service computer 6 or be accessed by service computer 6 that includes hazardous material classifications for each road or section of road.

Table 28 (FIG. 4), as discussed above, stores various information regarding user 22-$i$ and vehicle 10-$i$. Table 28 may further include the type of hazardous material that vehicle 10-$i$ or user 22-$i$ is transporting, which may be entered by user 22-$i$ during the registration process or when the type of hazardous material being transported is changed. There may be some limits or security steps that may be necessary to permit user 22-$i$ to change what is recorded as the type of hazardous material being transported. Alternatively, the type of hazardous material being transported may only be changed by the employer of user 22-$i$ (e.g., through a computer connected through data network 4 to service computer 6) and not by user 22-$i$.

As an example of operation, processor 30 of service computer 6 will typically monitor the location of mobile unit 12-$i$, determine the route or road that mobile unit 12-$i$ is traveling along (either with user 22-$i$ and/or vehicle 10-$i$), and whether the hazardous material being transported along with mobile unit 12-$i$ violates a hazardous material rule for that route or road. If a violation occurs, processor 30 may send a message or a notification of the violation to the appropriate party (e.g., person, company, or authority). Processor 30 may also alert user 22-$i$ and determine the best route (e.g., map or directions) to exit the prohibited or regulated route or area. Further details regarding exemplary rule-based actions using tracking data provided by a mobile unit may be found, for example, in U.S. patent application Ser. No. 10/377,574 to Shirish Puranik et al. entitled "Rule-Based Actions Using Tracking Data" filed Feb. 28, 2003, which is herein incorporated by reference in its entirety.

User 22-i may also provide a geographic specification to processing unit 30 (as explained herein, for example, in reference to FIGS. 6 and 7), which then accesses road data 42 or a separate database and provides hazardous material classifications or information pertaining to the geographic specification to user 22-i. The information may be provided via audio or visual techniques, as explained herein depending upon the interface employed by user 22-i. For example, if user 22-i can view a video display, processing unit 30 may provide an image, such as a map, that provides information regarding the geographic specification along with, for example, permitted and prohibited hazardous material areas displayed on the image. These permitted and prohibited hazardous material areas may be tailored based upon the type of hazardous material being transported by user 22-i, such as to show only prohibited hazardous material areas relevant to the type of hazardous material being transported by user 22-i.

Mobile unit 12-i may be set to provide location data at certain intervals. Alternatively, mobile unit 12-i may be dynamically configured to increase or decrease the frequency of location data updates to service computer 6. For example, service computer 6 may send configuration data to mobile unit 12-i to update the frequency of location data updates depending on various criteria. For example, the criteria may be based on the location of mobile unit 12-i relative to high risk areas or landmarks, such as large population centers, tunnels, bridges, water sources, stadiums, malls, or prohibited routes, which are known by service computer 6 (e.g., stored in road data 42 or maps 40).

For example, service computer 6 (or mobile unit 12-i itself) may change the frequency of location data updates, such as when a direction change occurs, based on velocity, or based on a rate of acceleration or deceleration. Further details regarding mobile resource management and providing a profile or configuration data to a mobile device may be found, for example, in U.S. patent application Ser. No. 10/377,575 to And Tiwari entitled "Dynamic Server Managed Profiles for Mobile Users" filed Feb. 28, 2003, which is herein incorporated by reference in its entirety.

As discussed above, system 1 (FIG. 1) is utilized to monitor mobile unit 12-i and provide, for example, traffic information, route information, and/or warn upon entering a prohibited hazardous material road section or area (assuming mobile unit 12-i is associated with the transportation of hazardous material). For example, system 1 may be employed to monitor current traffic conditions and designate a route for a vehicle carrying hazardous material that provides the fastest route or a route with the lowest level of traffic congestion while not violating the hazardous material road rules (e a., avoiding any prohibited hazardous material areas for the type of hazardous material being carried by the vehicle). However, depending upon the desired application, all or only some subset of the features discussed in reference to system 1 may be employed.

Figure 15:
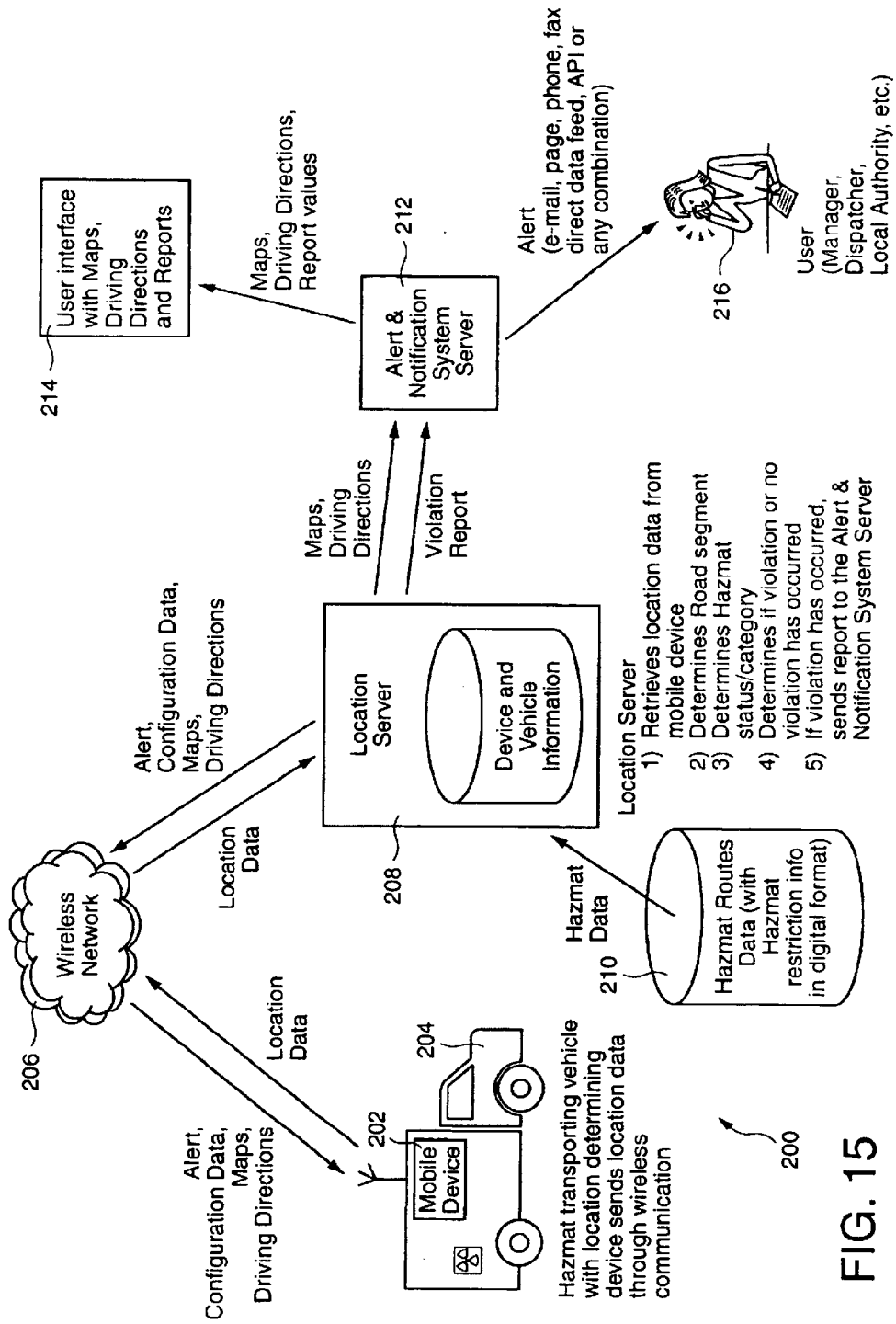
FIG. 15 depicts a system for collecting, determining, and disseminating route information in accordance with an embodiment of the present invention.

For example, FIG. 15 depicts a system 200 for collecting, determining, and disseminating route information and hazardous material traffic monitoring in accordance with another embodiment of the present invention. System 200 includes a mobile device 202, a wireless network 206, and a location server 208. In general, system 200 utilizes location data from mobile device 202 to monitor, for example, a vehicle 204 or any other possibly mobile object associated with mobile device 202 which is transporting hazardous material. System 200 sends an alert when the hazardous material being transported enters a road or a portion of a road (e.g., as part of a prohibited zone or area) where the particular hazardous material being transported is prohibited or when the hazardous material being transported deviates from a prescribed or a preferred route.

Consequently, by monitoring hazardous material being transported, it is possible to improve safety and prevent possible injury by alerting the appropriate personnel of hazardous material transportation violations. For example, the driver of the vehicle may be notified that a prohibited area has been entered and provided with driving instructions on the safest route of exiting the prohibited area. As another example, authorities may be notified when hazardous material enters city limits or a prohibited area so that the authorities may take the appropriate action.

Mobile device 202 includes a GPS receiver or other location determination device which provides mobile device 202 with location information (e.g., latitude and longitude information). For example, mobile device 202 may be a GPS enabled phone, personal digital assistant (PDA), or laptop computer or other type of device, such as an Internet Location Manager® (sold by At Road Inc. of Fremont, Calif.) that is capable of determining its location or couplable to a device that can provide location determination information. Mobile device 202 may be embedded in a vehicle that is transporting hazardous material (as in this example shown in FIGS. 15 and 16) or associated with a person carrying mobile device 202 (e.g., a driver of the vehicle or a person carrying hazardous material) or attached to a container containing the hazardous material.

Mobile device 202 communicates wirelessly (e.g., by employing CDPD, GPRS, AMPS, iDEN, CDMA, IXRTT, GSM, or IEEE 802.11 techniques) via a wireless network 206 to communicate with location server 208. Location server 208 (e.g., a server, a computer, or a data processor) may communicate wirelessly directly with mobile device 202 via wireless network 206 or wireless network 206 may be couplable to a wired network (not shown), such as for example the Internet to provide access to location server 208, which is coupled to the Internet.

For this example, mobile device 202 is associated with vehicle 204 that is transporting hazardous material. Mobile device 202 transmits location data to location server 208 via wireless network 206. Additional information may also be communicated between mobile device 202 and location server 208, such as described herein. For example, one or more of the following, such as alerts, configuration or profile data, maps, driving directions, messages, voice or data communications, traffic information, travel time, gas mileage, speed limits, hazardous material prohibited areas, etc., may be communicated between mobile device 202 and location server 208, depending upon the application and desired options or features.

Location server 208 receives location data from mobile device 202 and determines the location of mobile device 202 on the particular road that vehicle 204 is traveling on or area that vehicle 204 is within. Location server 208 then checks a hazardous material routes database 210 to determine the hazardous material (hazmat) status for that particular road (or portion of road or area where vehicle 204 is located).

Hazardous material routes database 210 may be part of location server 208 (e.g., stored in memory or as a separate database file within location server 208) or as a separate remote database that may be accessed by location server 208. Hazardous material routes database 210 may include information or attributes, such as for example, describing categories of prohibited materials, time and/or date restrictions, along with other regulation information for roads and zones (e.g., in a digital format that may be applied to digital maps).

Location server 208 can compare the category (or type) of the hazardous material that is being transported by vehicle 204 (which is provided to and stored by location server 208) and that is associated with mobile device 202 with information provided by hazardous material routes database 210 to determine if a hazardous material transportation violation has occurred or will occur (e.g., if vehicle 204 is approaching a prohibited area). For example, if the hazardous material information for vehicle 204 matches a category in the hazardous material routes database 210 for the location of vehicle 204, a violation report (e.g., alert, notice, warning, etc.) is generated. The violation report may be provided to a desired party 216, such as for example, a driver of vehicle 204, the driver's supervisor or dispatcher or other personnel of the employer of the driver, as well as possibly local, state, and/or federal authorities.

Location server 208 may provide the violation report to the desired person or agency, for example, or alternatively, the violation report may be provided by an alert and notification system (ANS) server 212 (FIG. 15). In either case, the violation report may be communicated in any desired fashion, such as for example via email, pager, telephone, fax, direct data feed, an application program interface (API), or any combination of the above.

Location server 208 may also directly, or through ANS server 212, provide maps, driving directions, or other information to the driver or any other person or agency, which describes a preferred route to exit the hazardous material regulated road or area. For example, the driver may receive the information (e.g., digital maps or listen to driving directions) via a user interface 214. For example, user interface 214 (which may be similar to what is described herein for a user interface) may allow the viewing of digital maps, the violation report, and/or driving directions through a visual interface, such as provided with a desktop computer, a laptop computer, a cellular phone, a PDA, or other type of device. User interface 214 may also or alternatively provide an audio interface, such as for example with a cellular phone or other audio device with speakers or headphones, which would allow someone to listen to driving directions or other information.

Figure 16:
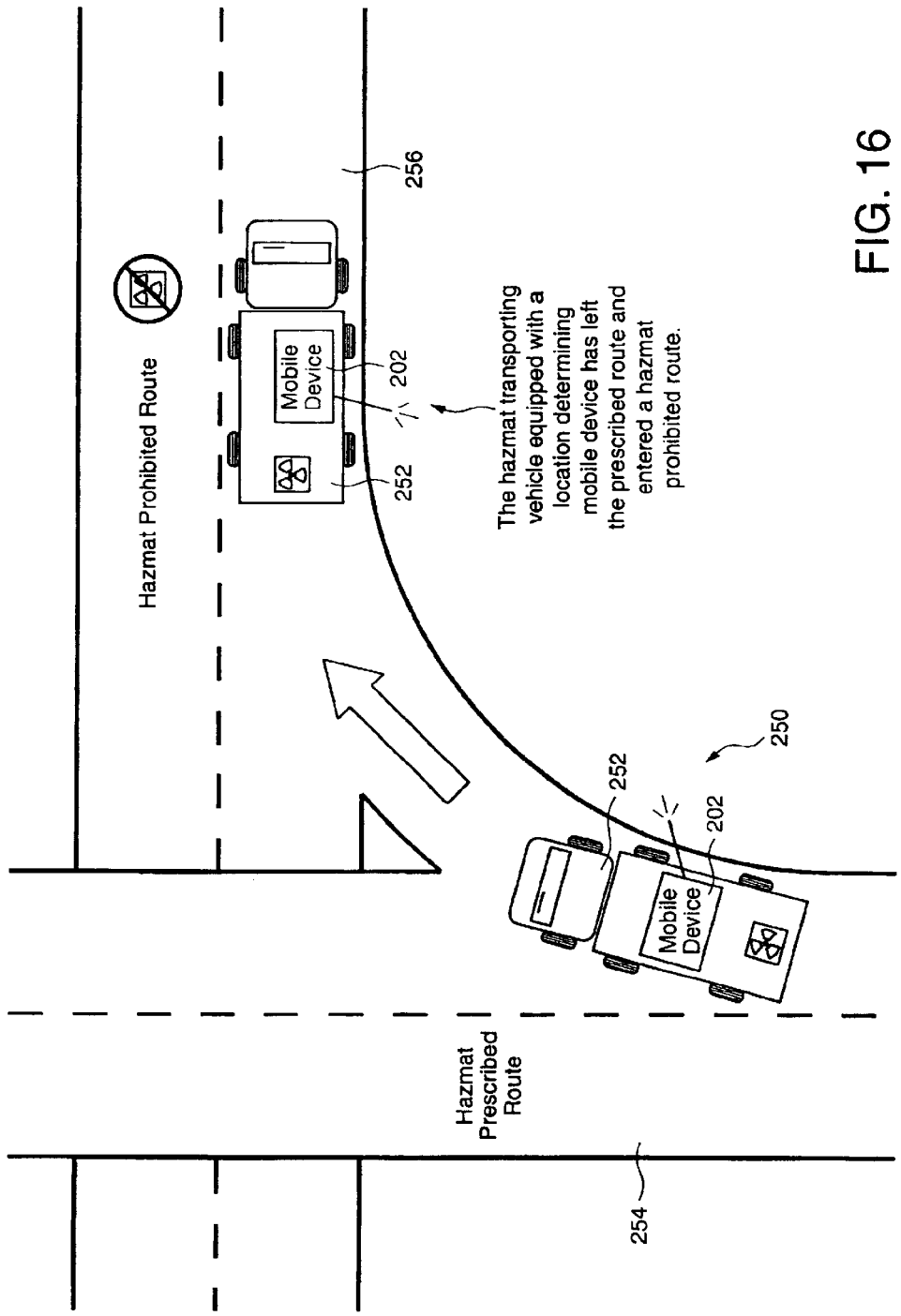
FIG. 16 depicts a vehicle carrying a user and a mobile unit and possible traffic routes in accordance with an embodiment of the present invention.

As an example, FIG. 16 depicts a vehicle 252 carrying hazardous material and possible traffic routes in accordance with an embodiment of the present invention. In this image shown in FIG. 16, vehicle 252 is exiting a hazardous material prescribed route 254 and is entering a hazardous material prohibited route 256. Location server 208, which monitors mobile device 202 that is associated with the hazardous material being carried by vehicle 252, will detect the violation and provide the proper notification, as described above.

FIG. 16 also illustrates an exemplary technique for providing maps to a driver of vehicle 252 and/or to another party, such as for example a manager, a dispatcher, an emergency response team having a mobile device or a console that is capable of displaying a map. For example, prohibited routes may be shaded or designated in some other manner (e.g., color, bold, cross-hatched, map layer, or other method such as described herein) to distinguish prohibited routes from prescribed or permitted routes. Thus, regulated hazardous material routes, high risk zones, and preferred routes may each be distinguished on the digital map to prevent hazardous material transportation violations.

Returning to FIG. 15, the hazardous material category that is being transported by vehicle 204, for example, may be stored along with other information related to vehicle 204 or mobile device 202 by location sever 208. A driver of vehicle 204 via user interface 214 (which is part of or couplable to mobile device 202, as explained herein) may be permitted to change the hazardous material category, or the changing of this information may be restricted to only authorized personnel, to accommodate, for example, different uses of vehicle 204. User interface 214 may also be utilized to display maps or providing driving directions and reports.

As explained herein, the location data from mobile device 202 may be dynamically configured to increase or decrease the frequency of location data updates from mobile device 202 to location server 208. For example, location server 208 may send configuration (profile) data to mobile device 202 to update the frequency based on various criteria, such as the vehicle's vicinity to high risk areas or landmarks, including large population centers, tunnels, bridges, water sources, stadiums, malls, etc, Mobile device 202 may also be configured to change its update rate intelligently based on a variety of criteria, such as for a direction change or a rate of acceleration or deceleration or based on velocity.

It should be understood that FIG. 15 illustrates system 200 for a given vehicle 204 and mobile device 202. However, system 200 may include a number of mobile devices 202 that may be associated with vehicles, containers, persons, or other types of mobile objects. Location server 208 communicates with each of mobile devices 202 and monitors their location in order to determine if hazardous material transportation violations occur and to take the appropriate action.

Figure 17:
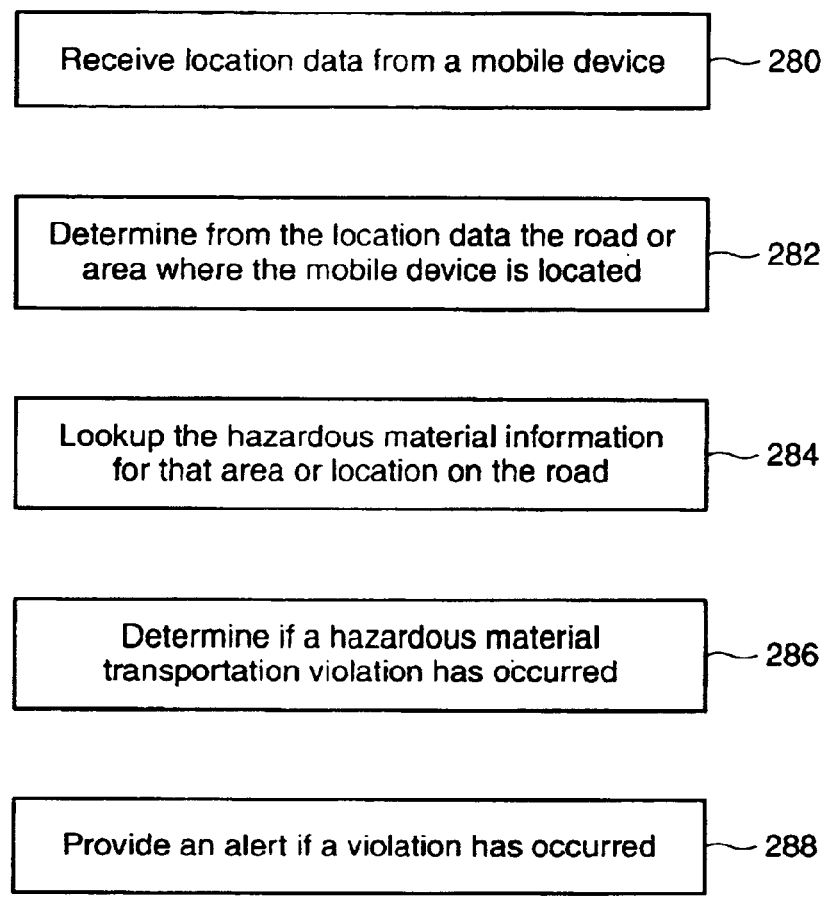
FIG. 17 depicts the process that a processing unit executes in order to collect and determine whether a vehicle has left its prescribed route or is on a prohibited-route in accordance with an embodiment of the present invention.

FIG. 17 depicts, in general, the process that location server 208 executes in order to collect and determine whether a vehicle has left its prescribed route (or a permitted route) or is on a prohibited route in accordance with an embodiment of the present invention. In step 280, location data is received from a mobile device and a location on a road or within a given area is determined (step 282). Information regarding hazardous material rules for that portion of the road or area is retrieved (step 282) and compared to the hazardous material corresponding to (or associated with) the mobile device to determine if a hazardous material transportation violation has occurred or is about to occur (step 286), such as by plotting current and past locations to determine direction and probable route. An alert or other notification (e.g., a violation report) is provided to appropriate parties or designated persons or agencies (step 288) if a violation has occurred (or a warning if a violation is about to occur).

In accordance with another embodiment of the present invention, a mobile device may be self-monitoring by having access to a hazardous routes database to monitor the location of the mobile device relative to prohibited hazardous material areas and broadcast an alert to a designated party if a hazardous material transportation violation occurs.

For example, referring to FIG. 15, mobile device 202 may store in its memory information from or similar to what is contained in hazardous material routes database 210. Mobile device 202 can then monitor its location relative to hazardous material areas or routes and determine prescribed or preferred routes and prohibited routes. If mobile device 202 determines that a hazardous material transportation violation has occurred (or is about to occur), a warning or an alert (e.g., a violation report) may be sent to party 216 via wireless network 206. In this embodiment, location server 208, hazardous material routes database 210, and ANS server 212 are not required or may serve a secondary roll, while mobile device 202 having user interface 214 and hazardous material routes database information performs some or all of their described functions.

Although the present invention is described using the above embodiments, the scope of the invention is not limited by the embodiments provided herein. It should be understood that numerous modifications and variations are possible in accordance with the principles of the present invention. For example, the embodiment described herein for monitoring hazardous material transportation may also be applied to the monitoring of heavy vehicles and the designation of roads where the heavy vehicles exceed the weight limit for the road. Thus, numerous variations and modifications are possible within the scope defined by the following claims.

What is claimed is:

1. A method of determining a hazardous material transportation violation, the method comprising:

receiving location data from a mobile unit over a data network;

retrieving hazardous material rules based on the location data;

comparing the hazardous material rules with a hazardous material being transported with the mobile unit to determine if the hazardous material rules are violated; and changing the frequency of receiving location data from the mobile unit depending upon a proximity of the mobile unit to a hazardous material prohibited area.

2. The method of claim 1, further comprising notifying a designated party if the hazardous material rules are violated.

3. The method of claim 1, further comprising:

determining a route for exiting an area defined by the hazardous material rules; and providing the route to the mobile unit.

4. The method of claim 3, wherein the determining of the route is further based on traffic conditions.

5. The method of claim 1, further comprising:

receiving a geographic specification from the mobile unit; and providing hazardous material rules to the mobile unit for the geographic specification.

6. The method of claim 5, wherein the providing of the hazardous material rules comprises a map of the geographic specification with the hazardous material rules displayed graphically on the map.

7. The method of claim 1, further comprising:

computing an actual velocity of the mobile unit using the location data; and calculating a parameter using the actual velocity and the location data, the parameter indicating traffic conditions surrounding the mobile unit, wherein the calculating comprises:

receiving a geographic specification from the mobile unit;

retrieving a speed limit of a road segment located within boundaries of the geographic specification;

calculating a difference between the speed limit and the actual velocity; and selecting a traffic level indicator representative of the difference.

8. The method of claim 1, wherein the location data is derived with at least one of a global positioning system, a time difference of arrival, an angle of arrival, and a ray tracing method.

9. The method of claim 1, wherein the data network comprises a wireless communication-network.

10. The method of claim 1, wherein the data network comprises:

a wireless communication network; and the Internet.

11. A system for determining transportation violations of a hazardous material, the system comprising:

a data processor; and a database couplable to the data processor, the database adapted to store hazardous material rules corresponding to geographic locations, wherein the data processor is adapted to compare the hazardous material rules to location information provided by mobile devices associated with hazardous materials to determine any violation of the hazardous material rules;

a memory couplable to the data processor, the memory adapted to store maps and data corresponding to each of the mobile devices along with at least one of configuration data for each of the mobile devices, messages, data communications, traffic information, traffic level indicators, and speed limits.

12. The system of claim 11, wherein the data corresponding to each of the mobile devices comprises at least one of user information, hazardous material, gas mileage, and travel time.

13. The system of claim 11, wherein the data processor is adapted to communicate to the mobile devices through the Internet and a wireless network.

14. The system of claim 13, wherein the wireless network employs CDPD, GPRS, AMPS, iDEN, CDMA, 1XRTT, GSM, or IEEE 802.11 standards.

15. The system of claim 11, wherein the data processor is adapted to change an update frequency of the location information provided by each of the mobile devices based upon the corresponding location information and the hazardous material rules.

16. The system of claim 11, wherein the data processor is adapted to provide a violation report for any determined violations.

17. A system comprising:

a plurality of mobile devices each adapted to provide location data through a wireless communication network;

means for receiving the location data through a data network couplable to the wireless communication network and for comparing hazardous material rules for geographic areas with the location data for at least one of the mobile devices which is associated with a hazardous material; and means for providing driving directions, maps, traffic information, traffic level indicators, and speed limits to each of the mobile devices.

18. The system of claim 17, wherein the location data is determined by a GPS receiver coupled to the mobile device.

19. The system of claim 17, wherein the wireless communication network utilizes CDPD, GPRS, AMPS, iDEN, CDMA, 1XRTT, GSM, or ISEE 802.11.

20. The system of claim 17, wherein the data network is the Internet.

21. The system of claim 17, wherein the receiving means and the comparing means comprises a server and a memory storing the hazardous material rules.

22. The system of claim 21, wherein the server is adapted to change an update interval for the location data based on the hazardous material rules and the location data.

23. The system of claim 17, further comprising means for alerting one or more designated parties of a violation of the hazardous material rules.

24. The system of claim 17, wherein each of the mobile devices is adapted to change an update interval for the location data based on at least one of the hazardous material rules relative to a location of the mobile device, a velocity of the mobile device, an acceleration of the mobile device, and a direction of the mobile device.

25. The system of claim 17, further comprising means for providing route information to each of the mobile devices based on the hazardous material rules and traffic conditions.

26. The system of claim 17, further comprising means for alerting one or more designated parties when at least one of the mobile devices deviates from a prescribed route.

27. The system of claim 17, wherein the hazardous material rules comprise prohibited hazardous materials for the geographic areas.

28. The system of claim 27, wherein the hazardous material rules further comprise time and date restrictions.

29. The system of claim 17, wherein the providing means is further adapted to provide gas mileage and travel time for each of the mobile devices.

30. The system of claim 17, wherein the receiving means is further adapted to receive a geographic specification from at least one of the mobile devices and provide to the mobile device the hazardous material rules for the geographic specification.

31. The system of claim 30, wherein the receiving means is further adapted to provide traffic level indicators for the geographic specification.

32. The system of claim 17, wherein the receiving means and the comparing means is further adapted to compare weight restriction rules for geographic areas with the location data for at least one of the mobile devices which is associated with a certain weight.

33. A method of determining a hazardous material transportation violation, the method comprising:

determining a location of a mobile device;

retrieving hazardous material rules based on the location;

determining if the hazardous material rules are violated based on the location and a hazardous material being transported with the mobile device;

computing an actual velocity of the mobile device based on the location; and calculating a parameter using the actual velocity and the location, the parameter indicating traffic conditions surrounding the mobile device, wherein the calculating comprises:

providing a geographic specification to the mobile device;

retrieving a speed limit of a road segment located within boundaries of the geographic specification;

calculating a difference between the speed limit and the actual velocity; and selecting a traffic level indicator representative of the difference.

34. The method of claim 33, further comprising notifying a designated party if the hazardous material rules are violated.

35. The method of claim 33, further comprising changing a frequency of the determining of the location depending upon a proximity of the mobile device to a hazardous material prohibited area based upon the hazardous material rules.

36. The method of claim 33, further comprising:

determining a route for exiting an area defined by the hazardous material rules; and displaying the route as a map by the mobile device.

37. The method of claim 36, wherein the determining of the route is further based on traffic conditions.

38. The method of claim 33, further comprising:

providing by a user of the mobile device a geographic specification; and displaying hazardous material rules by the mobile device for the geographic specification.

* * * * *